US007031075B2

(12) United States Patent
Tsuji

(10) Patent No.: US 7,031,075 B2
(45) Date of Patent: Apr. 18, 2006

(54) LENS APPARATUS AND CAMERA

(75) Inventor: Kanji Tsuji, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/003,497

(22) Filed: Dec. 6, 2004

(65) Prior Publication Data

US 2005/0128603 A1 Jun. 16, 2005

(30) Foreign Application Priority Data

Dec. 12, 2003 (JP) ............................ 2003-415794

(51) Int. Cl.
*G02B 15/14* (2006.01)
*G02B 7/02* (2006.01)

(52) U.S. Cl. ...................................... 359/694; 359/823

(58) Field of Classification Search ................ 359/694, 359/699, 819, 821–823
See application file for complete search history.

(56) References Cited

U.S. PATENT DOCUMENTS

| | | | | |
|---|---|---|---|---|
| 6,008,954 | A * | 12/1999 | Shintani et al. | 359/704 |
| 2003/0184877 | A1 * | 10/2003 | Kabe | 359/694 |
| 2005/0105193 | A1 * | 5/2005 | Kawanabe et al. | 359/694 |

FOREIGN PATENT DOCUMENTS

| | | |
|---|---|---|
| JP | 11-212135 | 8/1999 |
| JP | 2002-350702 | 12/2002 |

* cited by examiner

*Primary Examiner*—Ricky L. Mack
*Assistant Examiner*—M. Hasan
(74) *Attorney, Agent, or Firm*—Fitzpatrick, Cella, Harper & Scinto

(57) ABSTRACT

A lens apparatus is disclosed which can achieve, an optical adjustment with a simple structure having a small number of parts. The lens apparatus has a lens unit, a lens holding member which holds the lens unit, a first holding member which holds the lens holding member, and a second holding member which holds the first holding member.

6 Claims, 13 Drawing Sheets

LENS APPARATUS AND CAMERA

BACKGROUND OF THE INVENTION

1. Field of the Invention

The present invention relates to a lens apparatus which has a mechanism for adjusting a lens unit, and to a camera which has the lens apparatus.

2. Description of Related Art

It is conventionally known that, since manufacture errors occur in individual components of lenses and barrels in a lens apparatus, favorable optical performance is achieved by performing a tracking adjustment of moving lenses in an optical axis direction, an inclination adjustment of lenses, and a decentering adjustment of decentering lenses.

Especially for a zoom lens apparatus, a number of components are used to form the lens apparatus and the manufacture errors in the respective components are accumulated to cause a large error in the whole lens apparatus. Among other things, in a collapsible zoom lens apparatus having a plurality of retractable barrels which can be moved in the optical axis direction and put into a camera body, the accumulation of the manufacture errors of the respective components is increased, so that an optical adjustment mechanism needs to be provided in order to achieve excellent optical performance.

To meet that need, a known lens apparatus has a lens holder which holds a lens and allows an adjustment of the optical axis position of the lens by selecting the position of rotation in putting the lens into a barrel body, and an inclination adjustment mechanism which adjusts the inclination in putting the lens holder into the barrel body to adjust the inclination of the lens with respect to the optical axis. The lens apparatus is provided with a holder carrying member which holds the lens holder rotatable and integrally inclinable, and the inclination adjustment mechanism is coupled to the holder carrying member in the outer diameter direction of the lens holder, thereby achieving the optical adjustment (see Japanese Patent Application Laid-Open No. H11(1999)-212135).

Another known lens apparatus has a lens frame which holds a lens and a holding member which holds the lens frame. The holding member has an adjustment shape portion on which the lens frame abuts in the optical axis direction to make a decentering adjustment of the lens frame to the holding member in the direction perpendicular to the optical axis and a gradual position adjustment in the optical axis direction (see Japanese Patent Application Laid-Open No. 2002-350702).

In the inclination adjustment mechanism proposed in Japanese Patent Application Laid-Open No. H11(1999)-212135, however, the arrangement of the mechanism involves a number of parts to complicate the structure. Also, since it is necessary to provide the space for placing the inclination adjustment mechanism in the outer diameter direction of the lens holder, the lens apparatus is increased in size in the diameter direction.

In addition, the position of the lens subjected to the inclination adjustment is changed in the optical axis direction to result in a focus shift. This requires the action of achieving focus again in order to check whether favorable optical performance is realized after the inclination adjustment, presenting a problem that the inclination adjustment is difficult to perform while the optical performance is checked.

On the other hand, Japanese Patent Application Laid-Open No. 2002-350702 enables the decentering adjustment of the lens in the direction perpendicular to the optical axis and the gradual position adjustment in the optical axis direction. However, the width (space) for allowing the decentering adjustment (movement) of the lens is needed in the direction perpendicular to the optical axis, which causes a problem that the size of the lens apparatus is increased in the diameter direction.

SUMMARY OF THE INVENTION

It is an object of the present invention to provide a lens apparatus which has a simple structure composed of a reduced number of parts, has a compact size, and allows an easy adjustment.

According to one aspect, the present invention provides a lens apparatus which has a lens unit, a lens holding member which holds the lens unit, a first holding member which holds the lens holding member, and a second holding member which holds the first holding member. Here, at least one of the first and second holding members includes a position adjustment portion which abuts on the other and has a stepped shape for performing positioning of the first holding member to the second holding member in an optical axis direction. And at least one of the lens holding member and the first holding member includes a surface which abuts on the other and the lens holding member can turn with the surface.

According to one aspect, the present invention provides a camera which has the lens apparatus described above, and an image-pickup element which photoelectrically converts a luminous flux from the lens apparatus.

These and other characteristics of the lens apparatus and the camera of the present invention will be apparent from the following description of a specific embodiment with reference to the drawings.

DETAILED DESCRIPTION OF THE PREFERRED EMBODIMENTS (Embodiment 1)

A lens apparatus which is Embodiment 1 of the present invention is described with reference to FIGS. 1 to 13.

Figure 1:
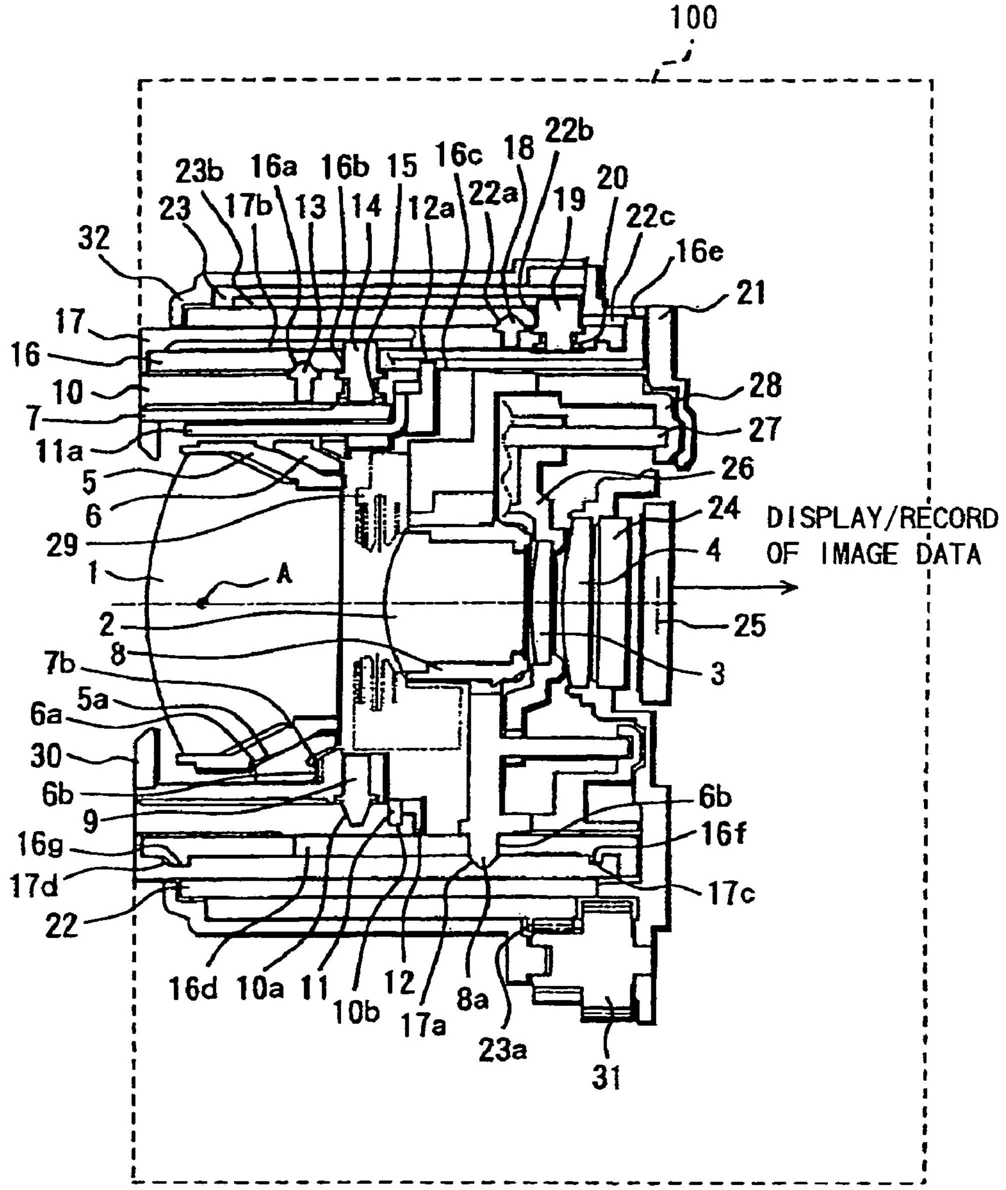
FIG. 1 is a section view of a lens apparatus which is collapsed in Embodiment 1 of the present invention.
Figure 2:
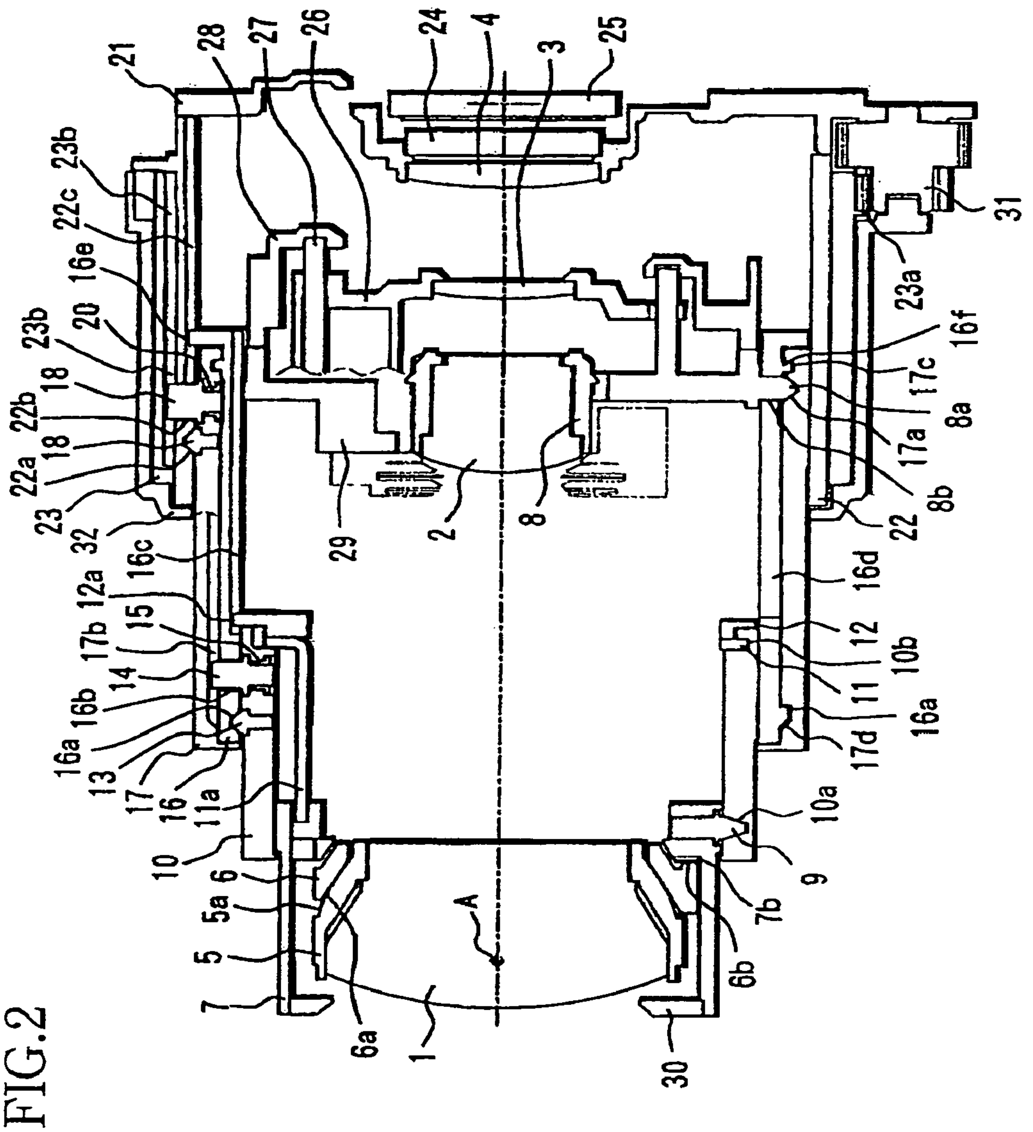
FIG. 2 is a section view of the lens apparatus in a WIDE state.
Figure 3:
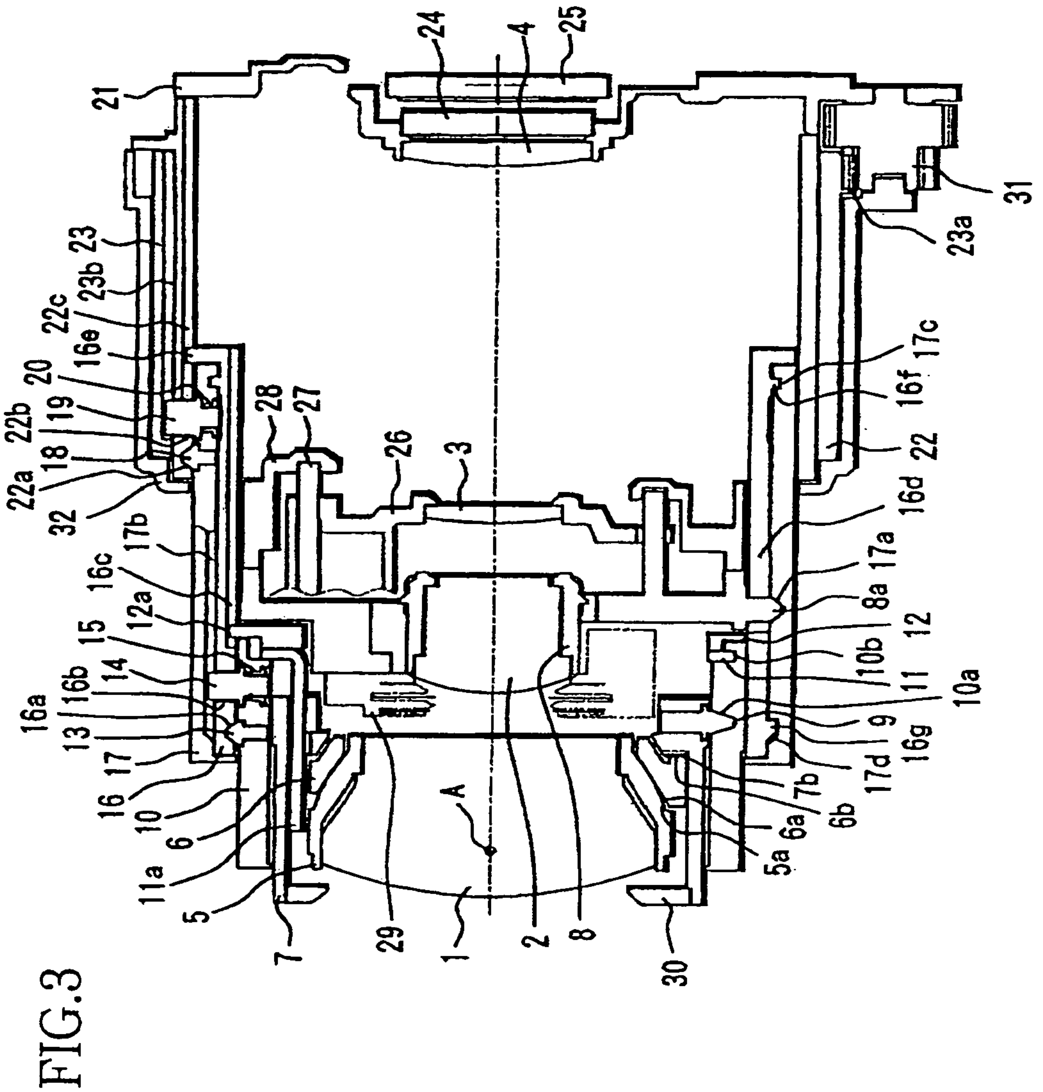
FIG. 3 is a section view of the lens apparatus in a TELE state.
Figure 4:
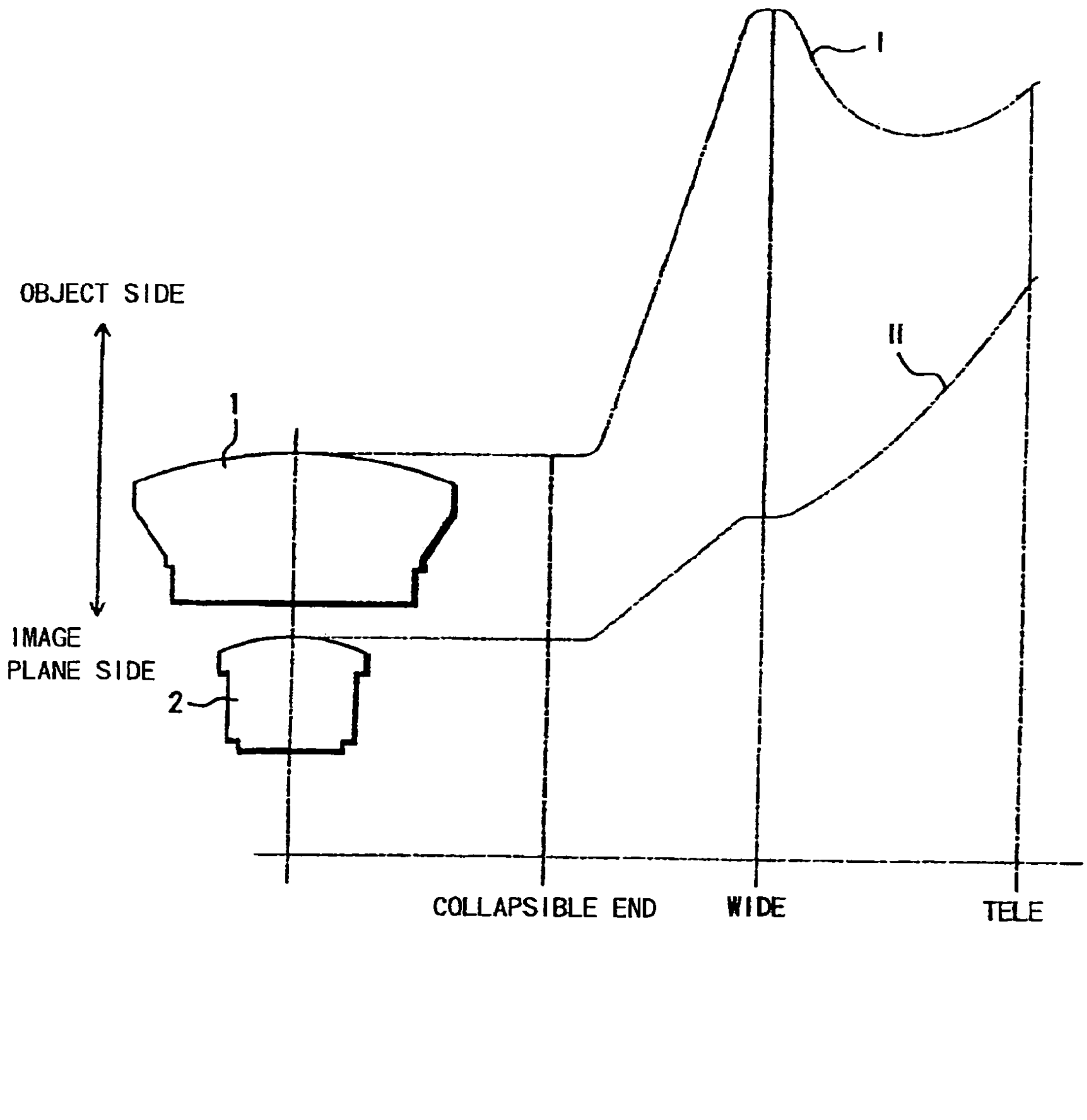
FIG. 4 shows the moving trajectories of a first lens unit and a second lens unit.

FIG. 1 is a section view of the lens apparatus which is collapsed. A dotted line in FIG. 1 shows the outline of a camera body 100 on which the lens apparatus is mounted. FIGS. 2 and 3 are section views of the lens apparatus in a WIDE state and a TELE state, respectively. FIG. 4 shows the moving trajectories of a first lens unit and a second lens unit.

Figure 5:
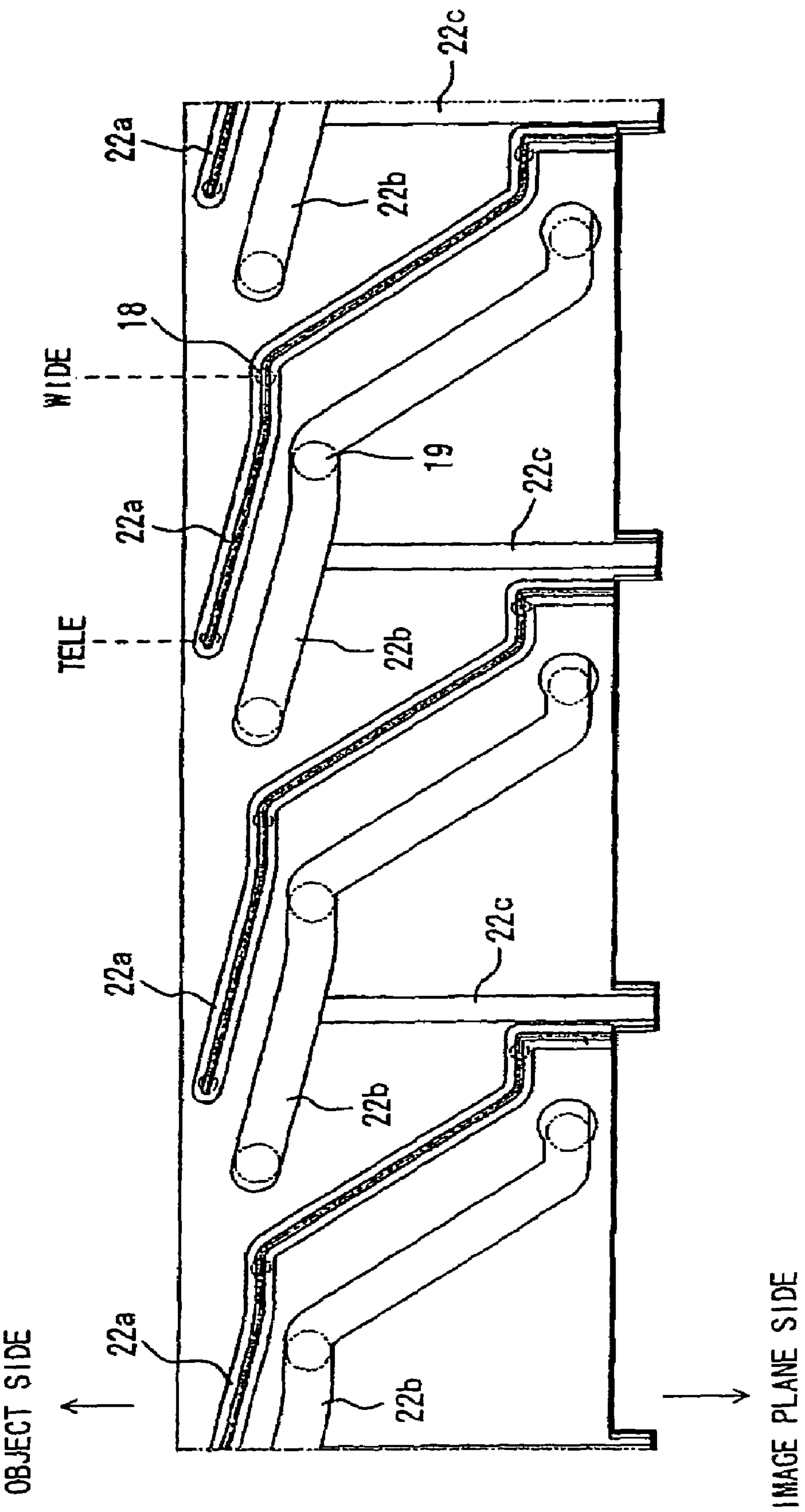
FIG. 5 is a development of a fixed barrel showing the inner surface thereof.
Figure 6:
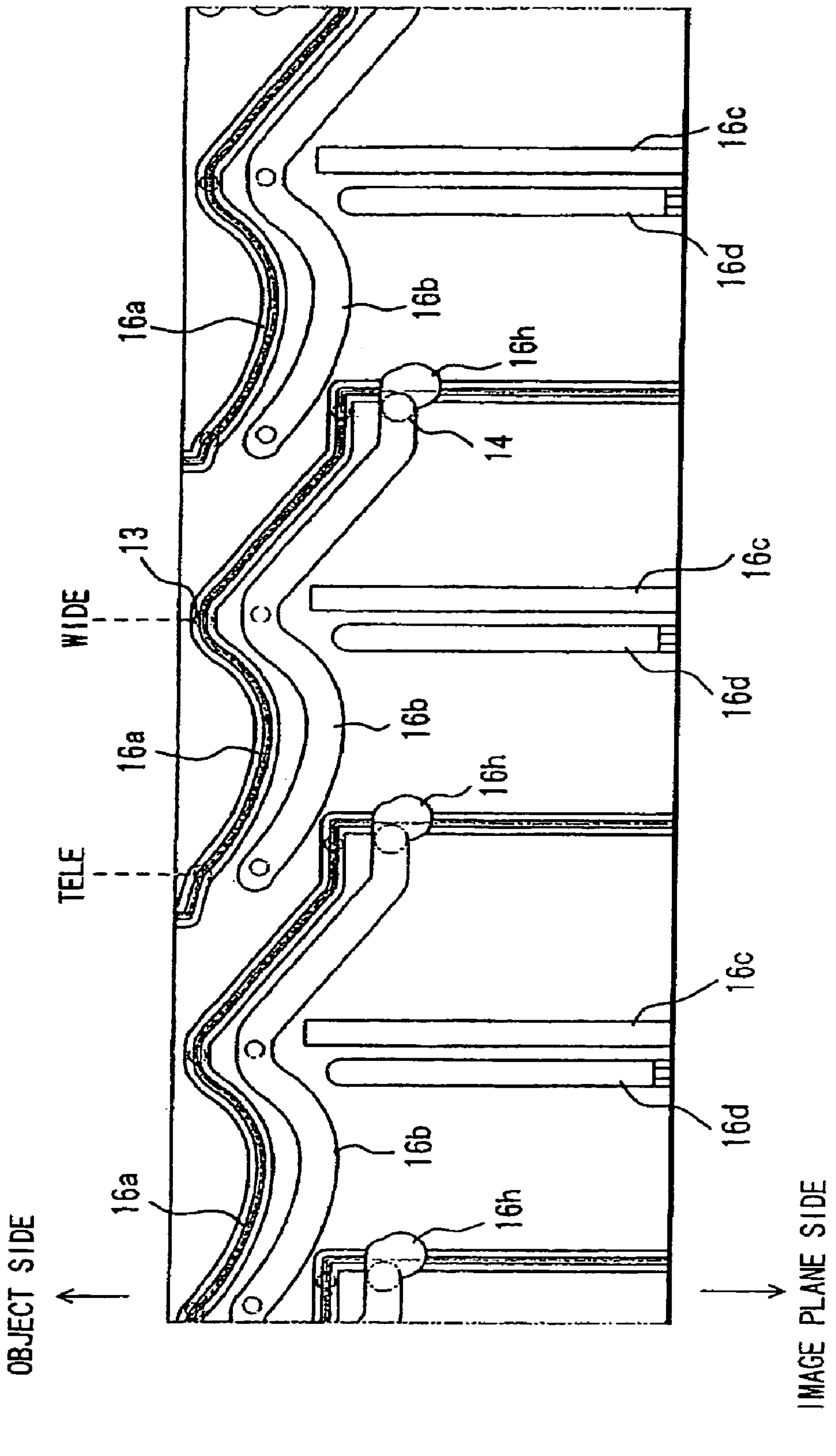
FIG. 6 is a development of a second cam barrel showing the inner surface thereof.
Figure 7:
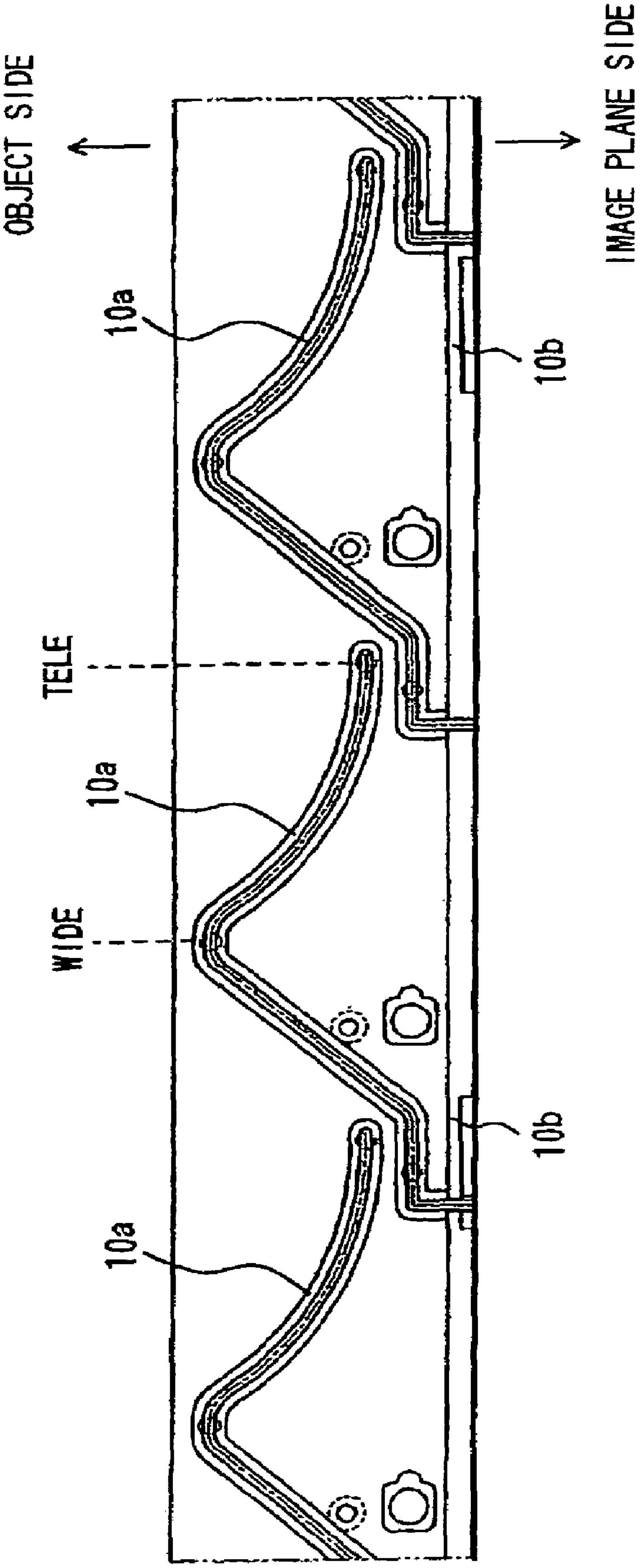
FIG. 7 is a development of a first cam barrel showing the inner surface thereof.
Figure 8:
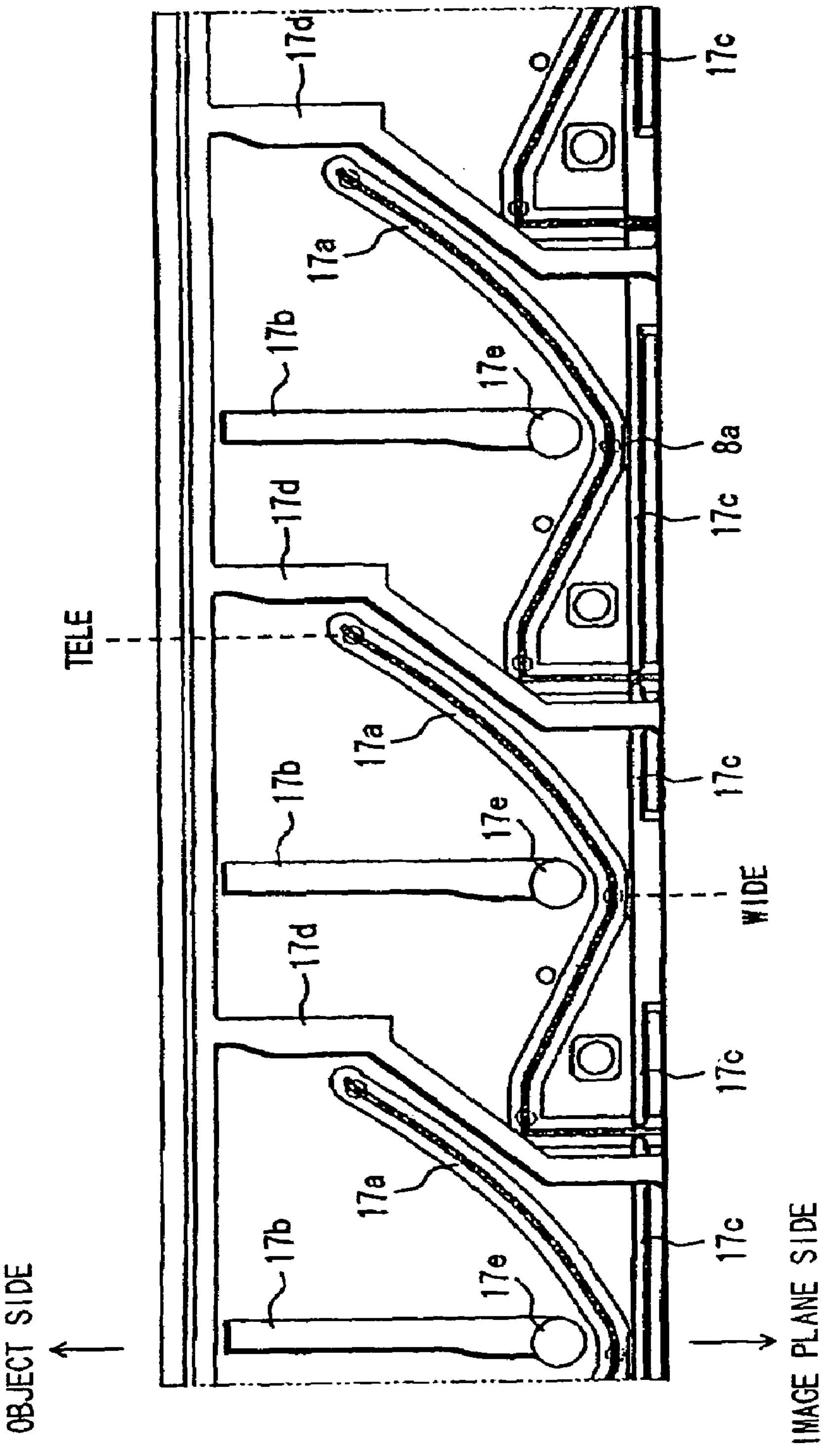
FIG. 8 is a development of a third cam barrel showing the inner surface thereof.
Figure 9:
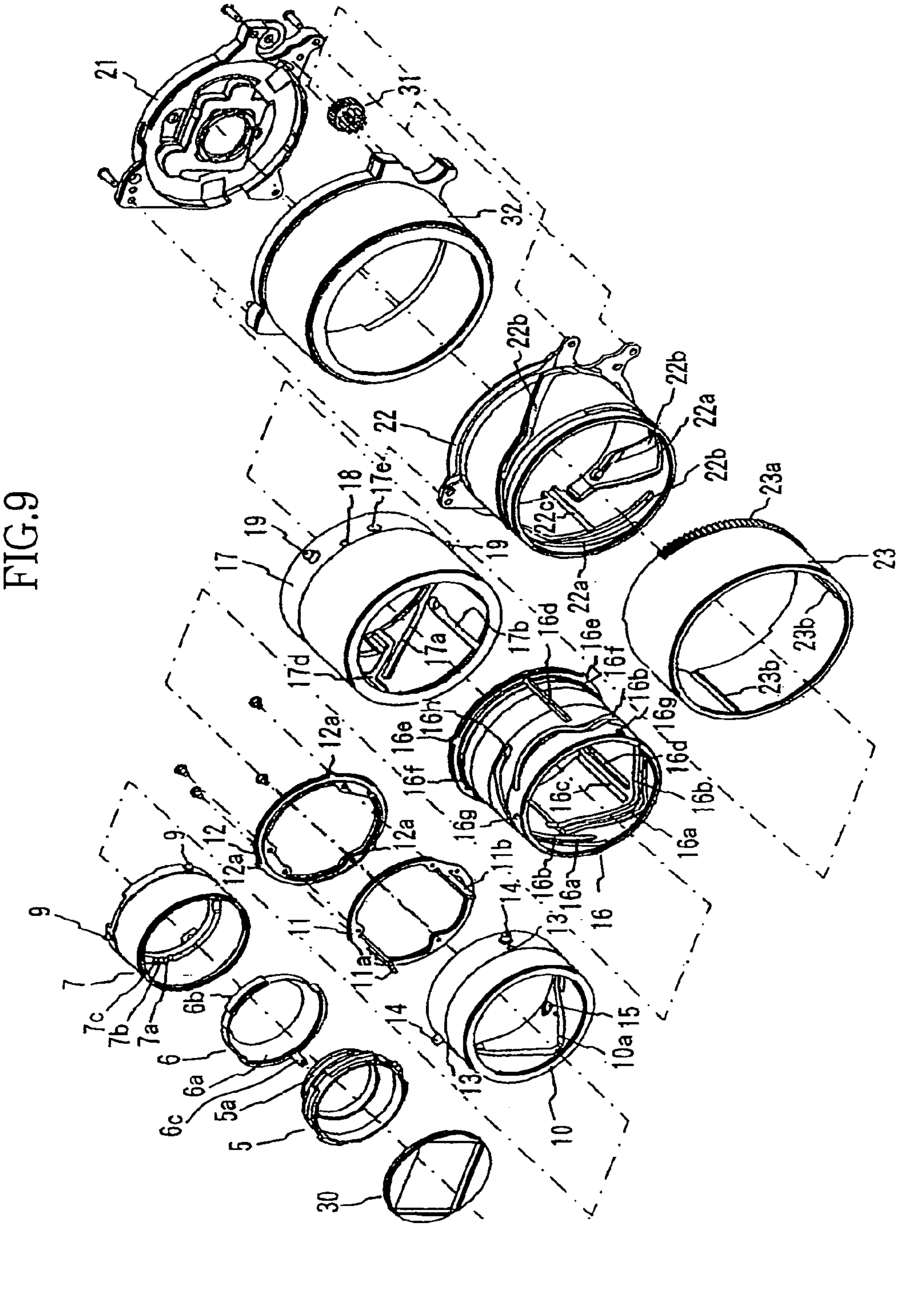
FIG. 9 is a perspective exploded view of the lens apparatus of Embodiment 1.
Figure 10:
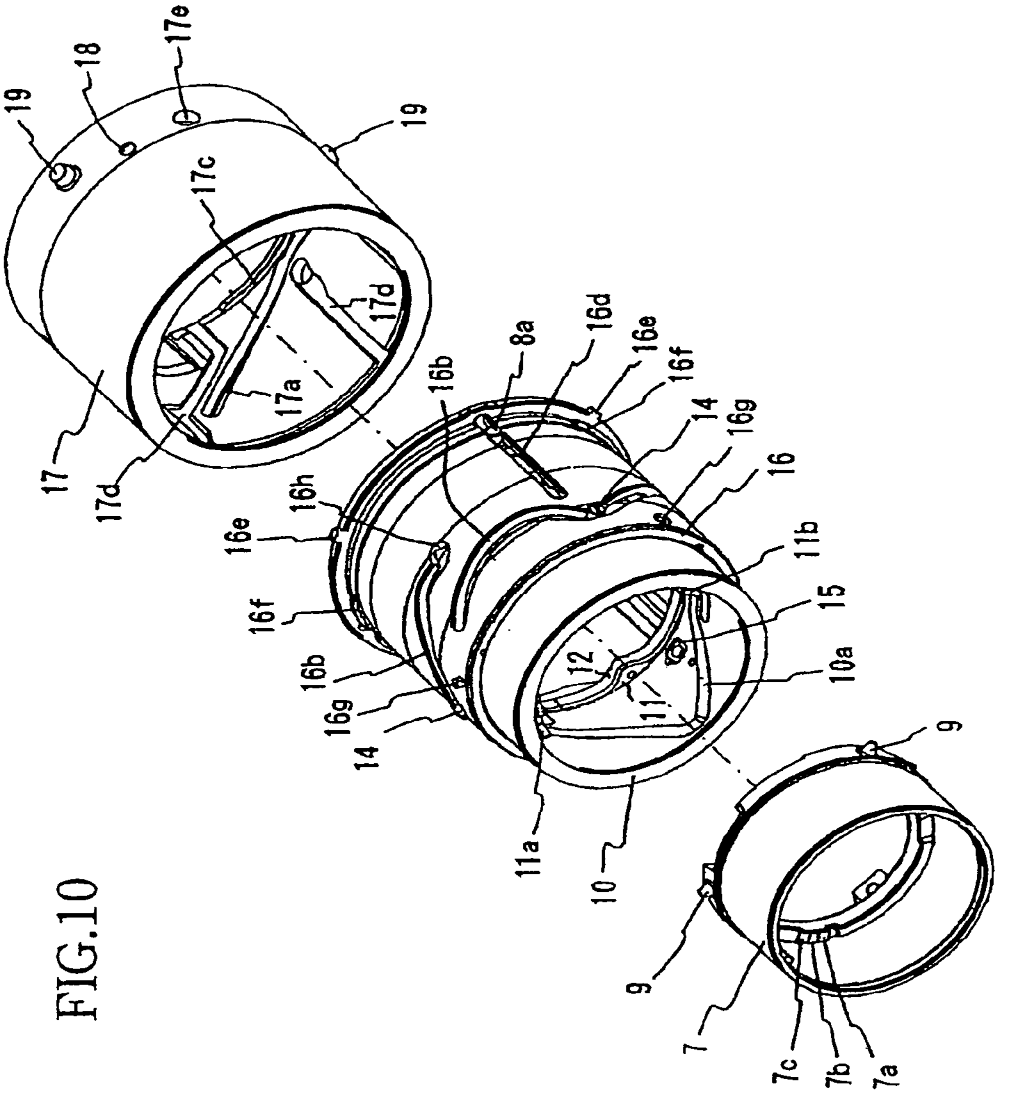
FIG. 10 is a perspective view showing the outer appearance of some components in the lens apparatus of Embodiment 1.
Figure 11:
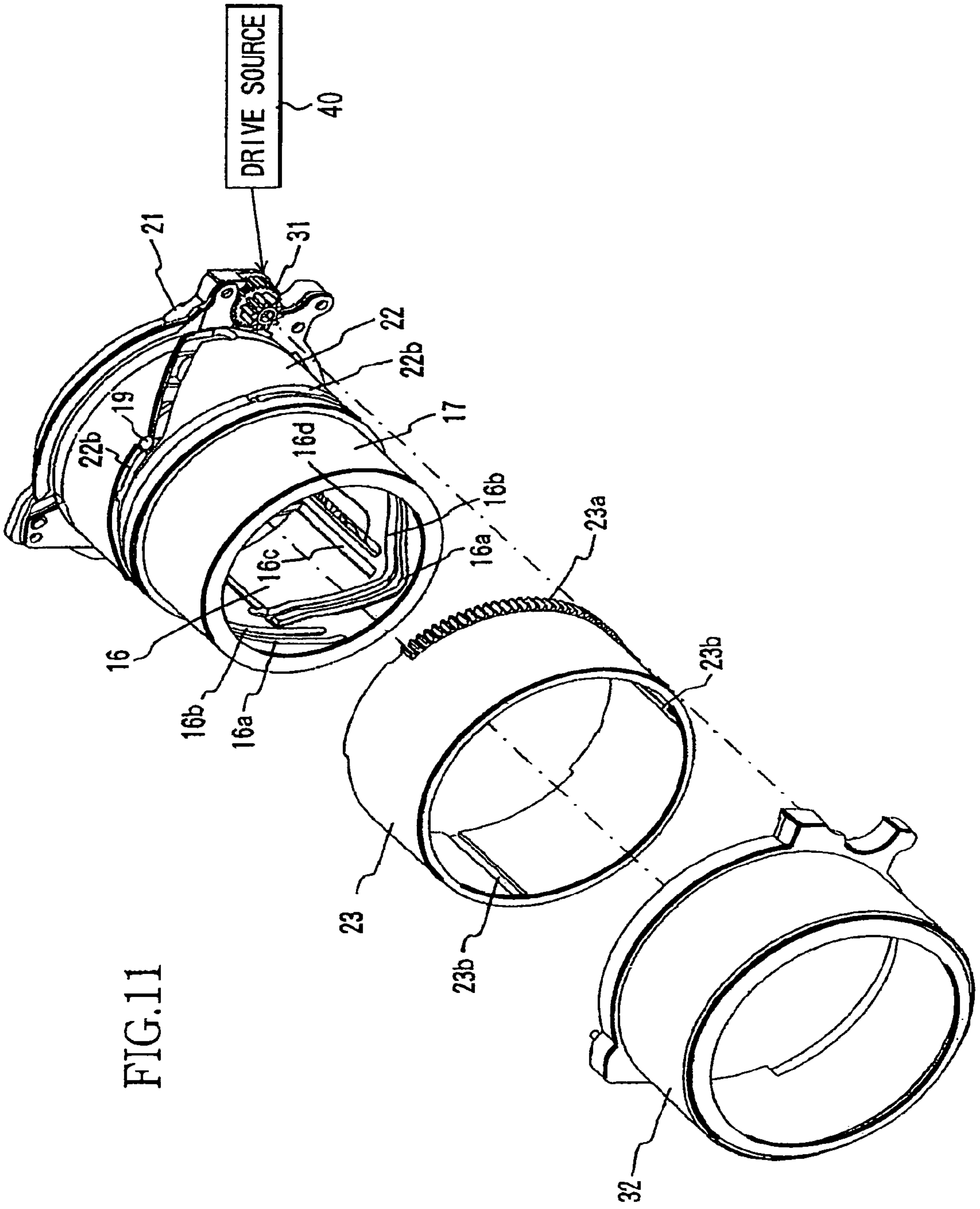
FIG. 11 is a perspective view showing the outer appearance of some components in the lens apparatus of Embodiment 1.
Figure 12:
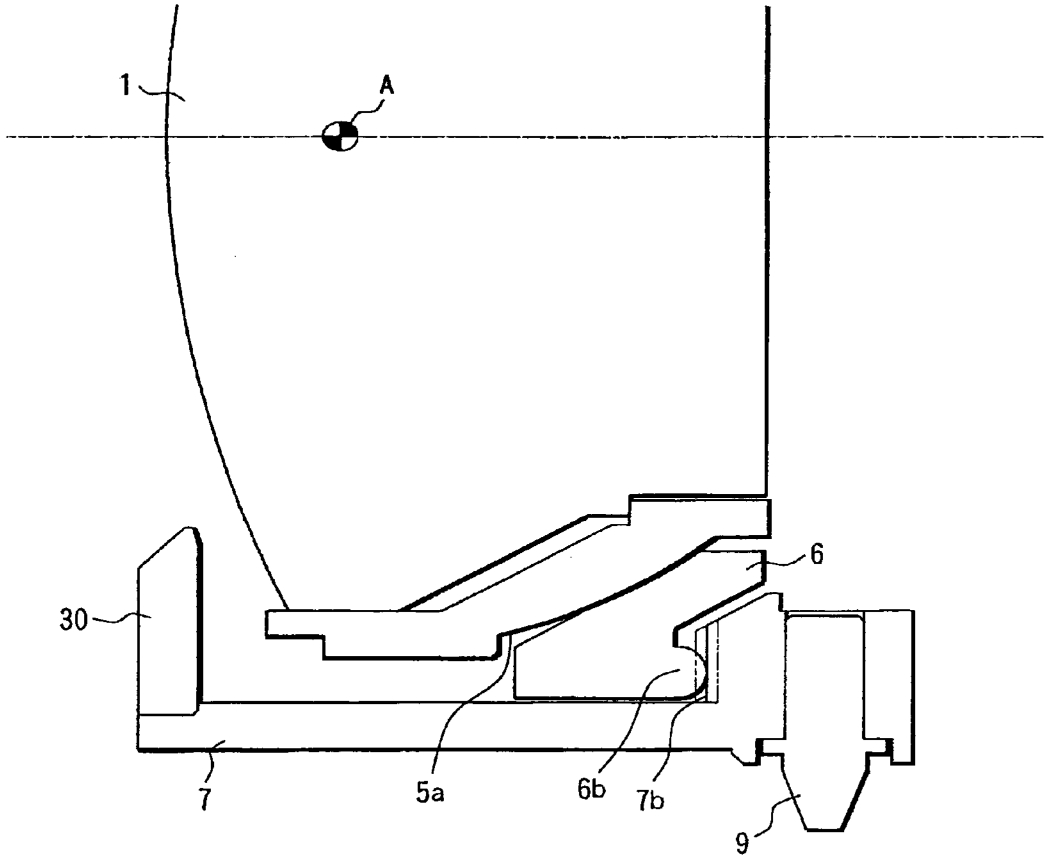
FIG. 12 is an enlarged view showing a section of some components including a first lens unit in the lens apparatus of Embodiment 1.

FIG. 5 is a development of a fixed barrel showing the inner surface thereof, FIG. 6 is a development of a second cam barrel showing the inner surface thereof, FIG. 7 is a development of a first cam barrel showing the inner surface thereof, and FIG. 8 is a development of a third cam barrel showing the inner surface thereof. FIG. 9 is a perspective exploded view of the lens apparatus of Embodiment 1. FIGS. 10 and 11 are perspective views showing the outer appearance of some components in the lens apparatus of Embodiment 1. FIG. 12 is a section view of some components including a first lens unit.

In those figures, reference numeral 1 shows the first lens unit positioned closest to an object side, 2 shows the second lens unit positioned closer to an image side than the first lens unit 1, 3 shows a third lens unit positioned closer to the image side than the second lens unit 2, and 4 shows a fourth lens unit positioned closer to the image side than the third lens unit 3.

Reference numeral 5 shows a first lens holder (a lens holding member) which holds the first lens unit 1 and has an R-shaped portion (a turn adjustment surface) 5*a* forming part of a spherical surface centered at a rear principal point A of the first lens unit 1. Reference numeral 6 shows a first moving member which is movable in an optical axis direction, holds the first lens holder 5, and has an outer circumferential surface fitted to the inner circumferential surface of a first holding member 7, later described. The first moving member 6 has a conical portion 6*a* which has a diameter reduced toward the image side and abuts on the R-shaped portion 5*a*. The first moving member 6 also has a protrusion 6*c* which is formed integrally and extends in the optical axis direction. The protrusion 6*c* is placed on the side of the periphery of the first lens holder 5.

Reference numeral 7 shows the first holding member (a second member) which holds the first moving member 6 and has, on its inner circumferential surface, stepped portions 7*a*, 7*b*, and 7*c* having surfaces at different positions in the optical axis direction. An R-shaped portion 6*b* formed on the first moving member 6 is formed to abut on one of the stepped portions 7*a*, 7*b*, and 7*c*.

The R-shaped portion 6*b* and the stepped portions 7*a*, 7*b*, and 7*c* (position adjustment portions) are provided for each of three angular ranges of 120 degrees in a circumferential direction of the first moving member 6 and the first holding member 7, respectively.

The first lens holder 5 and the first holding member 7 are bounded and fixed to each other while the first moving member 6 and the first lens holder 5 are placed within the first holding member 7.

Reference numeral 8 shows a second lens holder which holds the second lens unit 2, 9 shows a first cam follower which is pressed and fixed to the outer periphery of the first holding member 7, and 10 shows a first cam barrel which has, on its inner surface, a cam groove portion 10*a* which engages with the first cam follower 9.

Reference numeral 11 shows a guide member which has straight guide portions 11*a* and 11*b* for guiding the first holding member 7 in the optical axis direction and engages with a groove portion 10*b* for preventing the first cam barrel 10 from coming off. Reference numeral 12 shows a ring member which is fixed to the guide member 11 by screws and has, on its outer periphery, a protrusion 12*a* which extends outward in the diameter direction of the ring member 12.

The protrusion 12*a* engages with a straight guide groove portion 16*c* formed on the inner circumferential surface of a second cam barrel 16, later described, and extending in the optical axis direction, thereby allowing the ring member 12 to be moved only in the optical axis direction without rotation about the optical axis.

The guide member 11 and the ring member 12 can be fitted into the groove portion 10*b* (see FIG. 7) of the first cam barrel 10 in a predetermined position. When they are fitted thereinto, they can be rotated about the optical axis relative to the first cam barrel 10 and can be moved together in the optical axis direction.

Reference numeral 13 shows a cam follower which is formed on the outer periphery of the first cam barrel 10. Reference numeral 14 shows a pin shaped member (pin member) which is formed on the outer periphery of the first cam barrel 10 and engages with a straight groove portion 17*b* formed on the inner circumferential surface of a third cam barrel 17 in a later stage and extending in the optical axis direction to receive drive force from the straight groove portion 17*b*.

Reference numeral 15 shows a nut member for fixing the pin member 14 to the first cam barrel 10. Reference numeral 16 shows the second cam barrel which has a cam groove portion 16*a* engaging with the cam follower 13, a cam hole portion 16*b* through which the pin member 14 passes and which has the same cam trajectory as the cam groove portion 16*a*, and a straight guide groove portion 16*c* engaging with the protrusion 12*a* of the ring member 12 to prevent rotation of the ring member 12 about the optical axis and to guide the ring member 12 in the optical axis direction, as shown in FIG. 6.

The second cam barrel 16 also has a straight guide portion 16*d* which engages with a rotation regulating portion 8*b* of the second lens holder 8 to guide the second lens holder 8 in the optical axis direction, a protrusion 16*e* which engages with a straight guide groove portion 22*c* of a fixed barrel 22, later described, and a protrusion 16*f* which extends in the circumferential direction of the second cam barrel 16 and engages with a groove portion 17*c* of the third cam barrel 17, later described.

The second cam barrel 16 also has a protrusion 16*g* which, when any force is applied thereto from outside of the lens apparatus, abuts on a groove portion 17*d* of the third cam barrel 17 to receive the outside force, and a through-hole portion 16*h* for receiving the pin member 14.

Reference numeral 17 shows the third cam barrel which has, as shown in FIG. 8, a cam groove portion 17*a* engaging with a cam follower portion 8*a* integral with the second lens holder 8, a straight groove portion 17*b* engaging with the pin member 14 to transmit rotation force about the optical axis, a groove portion 17*c* allowing the protrusion 16*f* of the second cam barrel 16 to be fitted in a predetermined position and engaging with the protrusion 16*f* to prevent the second cam barrel 16 from coming off from the third cam barrel 17, a groove portion 17*d* in association with the protrusion 16*g*, and a through-hole portion 17*e* for receiving a pin member 19, later described.

Reference numeral 18 shows a cam follower which is pressed and fixed to the third cam barrel 17, and 19 shows the pin member which is attached to the third cam barrel 17 and engages with a straight groove portion 23*b* of a rotation barrel 23, later described, to receive rotation force about the optical axis. Reference numeral 20 shows a nut member for fixing the pin member 19 to the third cam barrel 17.

Reference numeral 21 shows a base member which is mounted on the camera body 100 and holds the fourth lens unit 4. Reference numeral 22 shows the fixed barrel which is mounted on and fixed to the base member 21. As shown in FIG. 5, the fixed barrel 22 has a cam groove portion 22*a* which engages with the cam follower 18, a cam hole portion 22*b* which engages with the pin member 19 and has the same trajectory as the cam groove portion 22*a*, and a straight groove portion 22*c* which engages with the protrusion 16*c* of the second cam barrel 16 to prevent rotation of the second cam barrel 16 about the optical axis and to guide the second cam barrel 16 in the optical axis direction.

Reference numeral 23 shows the rotation barrel which has a gear portion 23*a* formed on its outer circumference and the straight groove portion 23*b* formed on its inner surface to transmit rotation force about the optical axis to the pin member 19. The rotation barrel 23 can be rotated about the optical axis by receiving drive force from a drive source, not shown.

Reference numeral 24 shows an optical member (for example, a low pass filter) which is fitted into the base member 21 and is positioned in front of an image-pickup element 25. Reference numeral 25 shows the image-pickup element such as a CCD sensor and a CMOS sensor which is mounted on the base member 21 in a manner, not shown. The image-pickup element 25 photoelectrically converts an optical image formed by the lens units 1 to 4 into an electric signal and outputs accumulated electric charge. An output signal from the image-pickup element 25 is subjected to predetermined signal processing in a signal processing circuit, not shown, provided in the camera body, and then the processed signal is displayed as a taken image on a display section (not shown), or recorded on a recording medium (not shown).

Reference numeral 26 shows a third holding member which holds the third lens unit 3, and 27 shows a third guide member for guiding the third holding member 26 in the optical axis direction.

Reference numeral 28 shows a fixing member for positioning and fixing the third guide member 27, and 29 shows a stop shutter unit which is mounted on the second holding member 8. The stop shutter unit 29 adjusts an amount of light incident on an image plane by changing the area of an opening at a light passing port and adjusts the amount of light incident on the image plane by opening and closing a fixed opening formed in the stop shutter unit 29.

Reference numeral 30 shows a first cap member which is attached to the first holding member 7, and 31 shows a gear member which engages with the gear portion 23*a* of the rotation barrel 23 and is coupled to a power transmission mechanism, not shown, for transmitting drive force from a drive source 40. Thus, the drive force from a drive source, is transmitted to the rotation barrel 23 which is rotated about the optical axis. Reference numeral 32 shows a cover member which is attached integrally to the base member 21 and the fixed barrel 22 by screws.

FIG. 4 shows the moving trajectories of the first lens unit 1 and the second lens unit 2 in association with zooming of the lens apparatus. In FIG. 4, a chain line I shows the moving trajectory of the first lens unit 1, while a chain line II shows the moving trajectory of the second lens unit 2.

In the structure of the lens apparatus described above, description is made for switching between a collapsed state (FIG. 1), a WIDE state (FIG. 2), and a TELE state (FIG. 3) by outward/inward extension operation of the lens apparatus in the optical axis direction.

First, when drive force from a drive source 40, is transmitted to the gear portion 23*a* of the rotation barrel 23 through the gear member 31, the rotation barrel 23 is rotated about the optical axis. Since the pin member 19 of the third cam barrel 17 passes through the cam hole portion 22*b* of the fixed barrel 22 to engage with the straight groove portion 23*b* of the rotation barrel 23, the third cam barrel 17 is also rotated about the optical axis in response to the rotation of the rotation barrel 23 about the optical axis (see FIG. 11).

The cam follower 18 of the third cam barrel 17 engages with the non-linear cam groove portion 22*a* formed on the inner circumferential surface of the fixed barrel 22, so that the cam follower 18 is driven along the cam groove portion 22*a* in response to the rotation of the third cam barrel 17 about the optical axis. Thus, the third cam barrel 17 is moved in the optical axis direction while it is rotated about the optical axis relative to the fixed barrel 22.

The second cam barrel 16 is slidable about the optical axis relative to the third cam barrel 17 by the engagement of the protrusion 16*f* with the groove portion 17*c* and they are movable together with each other in the optical axis direction. In addition, since the protrusion 16*e* engages with the straight guide groove portion 22*c* of the fixed barrel 22, the second cam barrel 16 is moved only in the optical axis direction together with the third cam barrel 17 when the third cam barrel 17 is moved in the optical axis direction while rotated about the optical axis. The second cam barrel 16 is not rotated about the optical axis.

Since the pin member 14 of the first cam barrel 10 passes through the cam hole portion 16*b* of the second cam barrel 16 to engage with the straight groove portion 17*b* of the third cam barrel 17, the first cam barrel 10 can be rotated about the optical axis by receiving rotation force of the third cam barrel 17 about the optical axis. The cam follower 13 of the first cam barrel 10 engages with the cam groove portion 16*a* of the second cam barrel 16, so that the cam follower 13 is moved along the cam groove portion 16*a* by the rotation of the first cam barrel 10 about the optical axis. Thus, the first cam barrel 10 is moved in the optical axis direction while rotated about the optical axis relative to the second cam barrel 16 (see FIG. 10).

At this point, the guide member 11 and the ring member 12 fixed to each other by the screws are prevented from being rotated about the optical axis by the engagement of the straight groove portion 16*c* with the rotation regulating portion 12*a*. They are slidable about the optical axis relative to the first cam barrel 10 and they are movable integrally in the optical axis direction by the engagement of the ring member 12 with the groove portion 10*b*, so that they are moved only in the optical axis direction together with the first cam barrel 10.

Since the first cam follower 9 of the first holding member 7 engages with the cam groove portion 10*a* of the first cam barrel 10, the first cam follower 9 is moved along the cam groove portion 10*a* in response to the rotation of the first cam barrel 10 about the optical axis. At this point, the first holding member 7 is prevented from being rotated about the optical axis by the straight guide portions 11*a* and 11*b* of the guide member 11 extending in the optical axis direction, so that it is moved only in the optical axis direction.

With the aforementioned operation, the first holding member 7 (the first lens unit 1) is moved along the cam trajectory formed by combining the trajectories of the cam groove portion 22*a*, the cam groove portion 16*a*, and the cam groove portion 10*a* (shown as the line I in FIG. 4). The first lens unit 1 is operated between the housed position, the WIDE position, and the TELE position in accordance with that moving trajectory.

On the other hand, since the cam follower portion 8*a* of the second holding member 8 engages with the cam groove portion 17*a* of the third cam barrel 17, the cam follower portion 8*a* is moved along the cam groove portion 17*a* in response to the rotation of the third cam barrel 17 about the optical axis. At this point, the second holding member 8 is prevented from being rotated about the optical axis by the engagement of the straight groove portion 16*d* of the second cam barrel 16 with the rotation regulating portion 8*b*, so that the second holding member 8 is moved only in the optical axis direction.

With the aforementioned operation, the second holding member 8 (the second lens unit 2) is moved along the cam trajectory formed by combining the trajectories of the cam groove portion 22*a* and the cam groove portion 17*a* (shown as the line II in FIG. 4). The second lens unit 2 is operated between the housed position, the WIDE position, and the TELE position in accordance with that moving trajectory.

On the other hand, the third holding member 26 is movable together with the second holding member 8 and is movable in the optical axis direction by receiving drive force from a drive source, not shown, attached to the second holding member 8. The third holding member 26 is thus moved by a predetermined amount in accordance with a zoom position.

Next, an optical adjustment for the first lens holder (the first lens unit 1) is described in the lens apparatus of the structure described above. The optical adjustment is performed after the members are assembled except the first cap member 30. The first cap member 30 is attached after the optical adjustment.

Specifically, the periphery (the end face closer to the object side) of the first lens holder 5 is pushed and pulled to perform an inclination adjustment of the first lens unit 1 with respect to the image-taking optical axis centered at the point A (the rear principal point) in FIG. 1.

Figure 13:
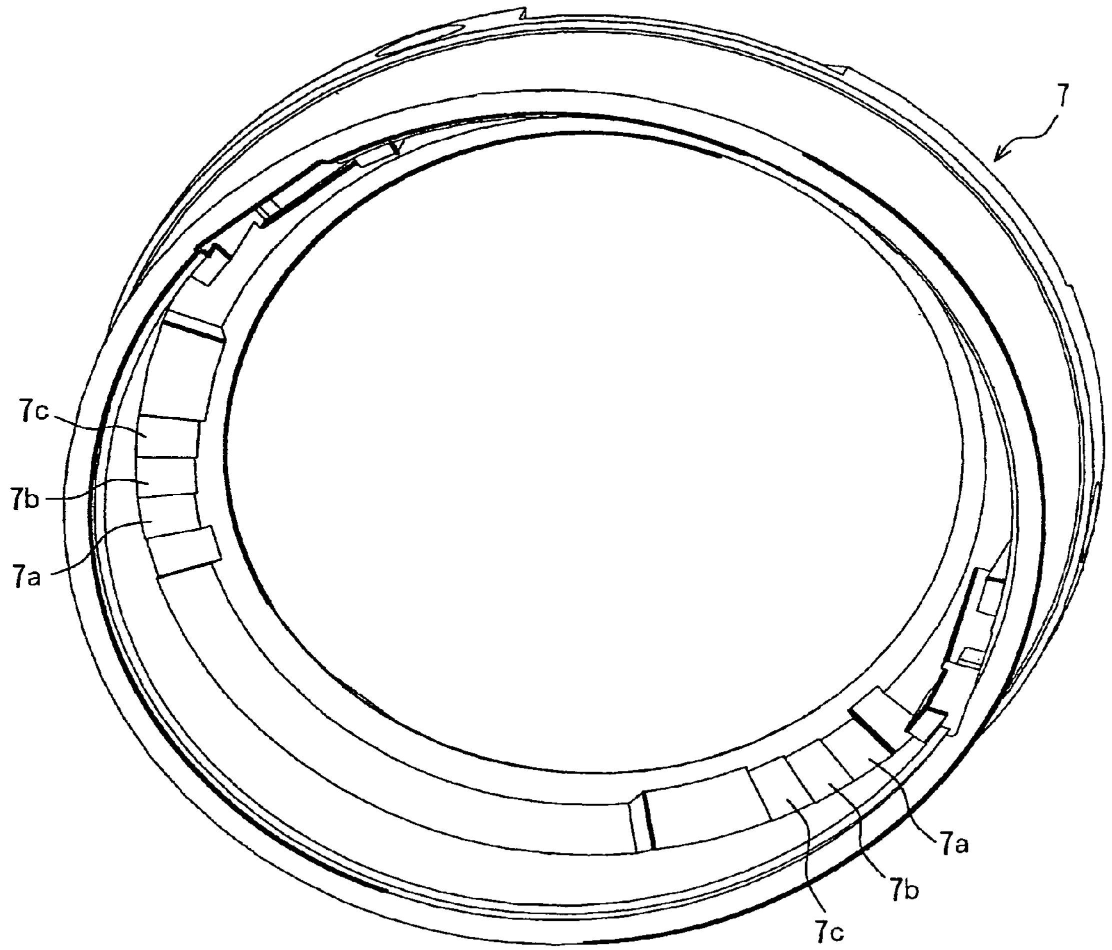
FIG. 13 is a enlarged view of a first holding member.

When the first cap member 30 is not attached, the protrusion 6*c* of the first moving member 6 projects from the outer circumference of the first lens holder 5 toward the front face of the lens apparatus. Thus, the protrusion 6*c* (see FIG. 9) is manipulated to rotate the first moving member 6 about the optical axis to cause the R-shaped portion 6*b* to abut on the end face of one of the stepped portions 7*a* to 7*c* as shown in FIG. 13 which is an enlarged view of the first holding member 7.

The positions of the stepped portions 7*a* to 7*c* in the optical axis direction are different from one another as described above. The R-shaped portion 6*b* can be caused to abut on one of the stepped portions 7*a* to 7*c* to change the position of the first moving member 6 (the first lens unit 1) in the optical axis direction. Consequently, a spacing adjustment (tracking adjustment) between the first lens unit 1 and the first lens unit 2 can be performed.

After the aforementioned inclination adjustment and tracking adjustment are performed and it is checked that predetermined optical performance is attained, the first lens holder 5 is fixed to the first holding member 7 through bonding or the like. The first cap member 30 is then fixed to the first holding member 7 to complete the assembly of the lens apparatus.

As described above, in the structure of the lens apparatus of Embodiment 1, the R-shaped portion 5*a* forming part of the spherical surface centered at the rear principal point A of the first lens unit 1 is formed on the outer circumferential surface of the first lens holder 5. In addition, the conical portion 6*a* with the diameter changed (reduced) gradually toward the image side is formed in the area of the first moving member 6 which abuts on the R-shaped portion 5*a*.

Since only the surface shapes of the first lens holder 5 and the first moving member 6 need to be changed, the structure can be simplified with a reduced number of the parts and eliminate the need to provide the space outside in the diameter direction of the first lens unit 1 as in the conventional lens apparatus. This can repress an increase in the size of the lens apparatus.

The first lens unit 1 is inclined to turn about the rear principal point A of the first lens unit 1, so that the inclination adjustment of the first lens unit 1 can be performed without a focus shift.

In addition, since the R-shaped portion 5*a* has a curvature as shown in FIG. 1 or the like in the aforementioned structure, the area of the R-shaped portion 5*a* in contact with the conical portion 6*a* is reduced as compared with the case when it is in contact with the conical portion 6*a* over the entire surface. The frictional resistance produced in inclining the first lens holder 5 can thus be reduced to easily perform the inclination adjustment.

The positional relationship between the respective stepped portions 7*a* to 7*c* in the optical axis direction can be set previously to determine the adjustment amount of the first lens unit 1 when the R-shaped portion 6*a* gradually abuts on each of the stepped portions 7*a* to 7*c*, thereby facilitating the tracking adjustment. This makes it easy to perform the tracking adjustment again when it is required.

Since the first lens unit 1 closest to the object side can be adjusted, the optical adjustment can be performed for the almost assembled lens apparatus, that is, when only the first cap member 30 is not attached. In addition, the aforementioned optical adjustment mechanism can be provided for the collapsible lens apparatus as in Embodiment 1 to realize the compact lens apparatus.

While the aforementioned embodiment has been described for the case where the R-shaped portion 5*a* is formed on the outer periphery of the first lens holder 5, it is possible that the surface of the first moving member 6 abutting on the first lens holder 5 is formed as part of a spherical surface centered at the rear principal point (which corresponds to the R-shaped portion 5*a*).

In addition, the same effects as those in Embodiment 1 can be achieved by providing the first moving member 6 with portions corresponding to the stepped portions 7*a* to 7*c* and providing the first holding member 7 with a portion corresponding to the R-shaped portion 6*b*.

According to the present invention, since the turn adjustment surface is formed on at least one of the lens holding member and a holding unit (the first moving member 6 and the first holding member 7), the optical adjustment of the lens unit can be performed with the simple structure.

The turn adjustment surface can have the shape of the spherical surface centered at the rear principal point to reduce the frictional resistance between the lens holding member and the holding unit on the turn adjustment surface. Thus, the turn adjustment of the lens holding member can be performed easily.

The turn adjustment surface can also be used as the surface for positioning the lens holding member to the holding unit in the optical axis direction to prevent the lens unit from being displaced in the optical axis direction to avoid a focus shift which occurs in the conventional lens apparatus.

The holding unit is formed of the first member which has the turn adjustment surface or abuts on the turn adjustment surface provided on the lens holding member and the second member which holds the first member. At least one of the first and second members has the position adjustment portion which abuts on the other and has the shape for adjusting the position of the first member to the second member in the optical axis direction. The arrangement allows the turn adjustment and the position adjustment with the simple structure having a small number of the parts to prevent an increase in the size of the lens apparatus.

When the position adjustment portion has the shape which enables the gradual position adjustment of the first member to the second member, the position adjustment can be set previously, and the position adjustment is easily performed on the basis of the setting.

The position adjustment portion has the shape which allows the position adjustment by rotation of the first member relative to the second member about the optical axis, so that only the rotation operation of the first member realizes the easy position adjustment.

Since the lens unit to be adjusted is placed closest to the object side in the plurality of lens units included in the lens apparatus, the aforementioned adjustments can be performed after the assembly of the lens unit is almost completed.

While preferred embodiments have been described, it is to be understood that modification and variation of the present invention may be made without departing from the scope of the following claims.

"This application claims priority from Japanese patent Application No. 2003-415794 filed on Dec. 12, 2003, which is hereby incorporated by reference herein."

What is claimed is:

1. A lens apparatus comprising:

a lens unit;

a lens holding member which holds the lens unit;

a first holding member which holds the lens holding member; and a second holding member which holds the first holding member, wherein at least one of the first and second holding members includes a position adjustment portion which abuts on the other and has a stepped shape for performing positioning of the first holding member to the second holding member in an optical axis direction, and at least one of the lens holding member and the first holding member includes a surface which abuts on the other and the lens holding member can turn with the surface.

2. The lens apparatus according to claim 1, wherein the surface has a spherical shape centered at the rear principal point of the lens unit.

3. The lens apparatus according to claim 1, wherein the surface also acts a surface for performing positioning of the lens holding member to the first holding member in the optical axis direction.

4. The lens apparatus according to claim 1, wherein the lens unit is placed closest to an object side in a plurality of lens units included in the lens apparatus.

5. A camera comprising:

the lens apparatus according to claim 1; and an image-pickup element which photoelectrically converts a luminous flux from the lens apparatus.

6. A lens apparatus comprising:

a lens unit;

a lens holding member which holds the lens unit;

a first holding member which holds the lens holding member; and a second holding member which holds the first holding member, wherein at least one of the first and second holding members includes a position adjustment portion which abuts on the other and has a stepped shape for performing positioning of the first holding member to the second holding member in an optical axis direction, and one of the lens holding member and the first holding member includes a rounded surface which abuts on the other and the other includes a flat surface which abuts on the rounded surface.

* * * * *

UNITED STATES PATENT AND TRADEMARK OFFICE
CERTIFICATE OF CORRECTION

PATENT NO. : 7,031,075 B2 
APPLICATION NO. : 11/003497
DATED : April 18, 2006
INVENTOR(S) : Kanji Tsuji It is certified that error appears in the above-identified patent and that said Letters Patent is hereby corrected as shown below:

ON THE TITLE PAGE
At Item (57), Abstract, line 1, "achieve," should read --achieve--.

COLUMN 10
Line 17, "acts a" should read --acts as a--.

Signed and Sealed this

Twentieth Day of February, 2007

JON W. DUDAS
*Director of the United States Patent and Trademark Office*